United States Patent
Ravilla et al.

(10) Patent No.: US 9,469,003 B2
(45) Date of Patent: Oct. 18, 2016

(54) UNCLAMP FEEDBACK UNIT

(71) Applicant: Kennametal India Limited, Bangalore (IN)

(72) Inventors: Deepak Kumar Ravilla, Bangalore (IN); Vijay Chandra Pothamsetti, Bangalore (IN); Akshath Shenoy H.B., Bangalore (IN)

(73) Assignee: KENNAMETAL INDIA LIMITED, Bangalore (IN)

(*) Notice: Subject to any disclaimer, the term of this patent is extended or adjusted under 35 U.S.C. 154(b) by 223 days.

(21) Appl. No.: 14/109,561

(22) Filed: Dec. 17, 2013

(65) Prior Publication Data

US 2014/0367903 A1 Dec. 18, 2014

(30) Foreign Application Priority Data

Dec. 24, 2012 (IN) .......................... 5366/CHE/2012

(51) Int. Cl.
| B23Q 3/08 | (2006.01) |
|---|---|
| B25B 5/06 | (2006.01) |
| B25B 5/16 | (2006.01) |
| G01F 9/00 | (2006.01) |
| G01L 7/16 | (2006.01) |

(52) U.S. Cl.
CPC ............... B23Q 3/08 (2013.01); B25B 5/061 (2013.01); B25B 5/16 (2013.01); G01F 9/006 (2013.01); G01L 7/166 (2013.01); Y10T 29/494 (2015.01); Y10T 137/7925 (2015.04)

(58) Field of Classification Search
CPC ........ B23Q 3/08; B23Q 3/082; B23Q 17/22; F15B 15/2815
USPC ................ 269/25, 32, 56, 890.09, 27; 91/1; 29/890.09
See application file for complete search history.

(56) References Cited

U.S. PATENT DOCUMENTS

| 6,059,277 | A  | * | 5/2000  | Sawdon    | B25B 5/16  |
|---|---|---|---|---|---|
|           |    |   |         |           | 269/24     |
| 6,929,254 | B2 | * | 8/2005  | Steele    | F15B 15/063|
|           |    |   |         |           | 269/24     |
| 7,111,834 | B2 | * | 9/2006  | Steele    | F15B 15/063|
|           |    |   |         |           | 269/24     |
| 8,678,362 | B1 | * | 3/2014  | Luthi     | B25B 5/064 |
|           |    |   |         |           | 269/239    |
| 2005/0035516 | A1 | * | 2/2005 | Sawdon   | B25B 5/087 |
|           |    |   |         |           | 269/32     |
| 2011/0101587 | A1 | * | 5/2011 | Quintania | B25B 5/006 |
|           |    |   |         |           | 269/74     |
| 2011/0291341 | A1 | * | 12/2011 | Sawdon   | B25B 5/062 |
|           |    |   |         |           | 269/216    |
| 2012/0267838 | A1 | * | 10/2012 | Rentz    | B25B 5/16  |
|           |    |   |         |           | 269/32     |

OTHER PUBLICATIONS

Sensing Air Link Clamp—model CLX-T; Pascal Co.; Pamphlet PA-460E Rev. 3 2015. 02.*

* cited by examiner

*Primary Examiner* — Moshe Wilensky
*Assistant Examiner* — Mahdi H Nejad
(74) *Attorney, Agent, or Firm* — Matthew S. Bedsole

(57) ABSTRACT

The disclosure generally relates to unclamp sensing feedback devices for clamping or holding devices in automatic production lines more specifically to a link clamp assembly. Further, the disclosure also provides the method of achieving feedback to sense fully unclamped condition of the link clamp cylinder.

7 Claims, 4 Drawing Sheets

UNCLAMP FEEDBACK UNIT

CLAIM TO PRIORITY

This application is a National entry application of Indian Application No. 5366/CHE/2012, filed on Dec. 24, 2012, the entire contents of which is incorporated herein by reference.

FIELD OF THE INVENTION

Embodiments of the present disclosure relates to a pneumatic feedback system. More particularly, related to unclamp sensing feedback system for sensing fully unclamped condition of link clamp cylinder used in automatic production lines.

BACKGROUND OF THE INVENTION

In production or manufacturing industries, integration of automatic flow lines or automation to the processes involved in production manufacturing is gaining importance due to improved product quality, high repeatability, high positioning accuracy and operating time reduction. Automation also greatly decreases the need for continuous human intervention while increasing load capacity, speed and safety. Machine safety logic, governs the automation to perform specific operations including clamping and unclamping of the work pieces.

One way of clamping and unclamping the work pieces, is carried out using clamping devices such as link clamp cylinders because the link clamp cylinders takes minimum space requirements as there is no swiveling motion of the clamp lever during clamping and unclamping operations. These link clamp cylinders are operated by displacement of hydraulically or pneumatically actuated piston appropriately linked to the link clamp assembly to facilitate clamping and unclamping operations. The link clamp cylinders are placed in required position in an automation system which can hold work pieces, so that the other components of the automation can carry out their pre-set functions on the work piece. After completion of operations, the work piece is unclamped by the link clamp cylinder. Thus, unclamp sensing becomes important in automation because if the work piece is not properly unclamped, the automation system will move the work piece, which is neither clamped nor unclamped rigidly and may cause serious accident in the shop floor and the operators. Hence automation system without feedback unit has disadvantages, predominant one being vulnerability, which makes the automation more prone to errors or mistakes which will have serious consequences or accidents while operating.

For example, in a gantry system used to pick and place heavy work pieces in a shop floor of an industry. The gantry consists of fixture appropriately mounted on a guide way, to hold the work piece that is to be picked and placed, and machine safety logic to govern the movement of the fixture. The machine safety logic first sends signals appropriately so that the fixture clamps the work piece. After clamping the work piece, the work piece is then transferred to a predetermined location at a predetermined speed. A controller in the gantry system sends signals appropriately to machine safety logic, so that the fixture unclamps the work piece. If the unclamping is not carried out properly, the gantry moves the work piece and may cause serious accident in the work space. Hence, safety in automation system becomes a predominant aspect to be considered while constructing any automation system and hence there exist a need of a mechanism for unclamp sensing in the link clamp cylinders used in automation. The safety in automation refers to safety of operators, fixtures and robot/gantry loader.

Further, in the existing link clamp cylinder the unclamp feedback unit is generally provided from the bottom of the link clamp cylinder. In base types of fixture applications use of this bottom pneumatic feedback unit is not feasible because of height and weight constraints. Unclamp sensing feedback unit at the bottom of the link clamp cylinder will increase the height of the cylinder, this increase in height will obstruct the movement of cutting tools during operation. To compensate for the increase in height of link clamp cylinder, the cutting tool length has to be increased which is not desirable. Also, installing the unclamp feedback unit at the bottom of the link clamp cylinder will be expensive. And because of the additional feedback unit, weight of the whole component will increase which is not desirable.

In light of the foregoing discussion, it is necessary to develop unclamp sensing feedback unit which is economical and at the same time overcome the limitations stated above.

SUMMARY OF THE INVENTION

The limitations of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

In an embodiment of the present disclosure, a link clamp assembly for detecting the unclamping of the link clamp cylinder is disclosed. The link clamp assembly consists of a piston at the vicinity of centre of the link clamp cylinder. A clamp lever, pivoted by a pivot pin is connected to the piston of the link clamp cylinder. The pivot pin connected to the clamp lever of the link clamp cylinder is fixed to a feedback unit. Further, at least one bracket is mounted on the link clamp cylinder. A plate is mounted below the at least one bracket such that the plate is in between the at least one bracket and the surface of the link clamp cylinder. Further, a feedback unit is configured in the link clamp assembly which comprises of a pivot pin, a spring loaded piston and a pneumatic input unit. A sensor is configured in the machine safety logic, to send a feedback signal upon detecting state of air flow in the pneumatic check line of the link clamp cylinder to indicate the fully unclamped condition.

In one embodiment, the at least one bracket is configured with a substantially flat base, orientation elements and mounting elements. The orientation elements of the at least one bracket extend vertically from the flat base of the at least one bracket. The mounting elements of the at least one bracket extends below the base for mounting the at least one bracket onto the link clamp cylinder. Further, a plate is fixed to the at least one bracket and the plate is configured with a substantial flat surface with at least one side face of the plate is perpendicular to the substantial flat surface.

A method of assembly of the link clamp assembly, to detect unclamping of a link clamp cylinder is disclosed as an embodiment of the present disclosure. The method comprising acts of connecting a clamp lever to a piston located at the vicinity of the centre of a link clamp cylinder and mounting at least one bracket on the link clamp cylinder. Further, mounting a plate below the at least one bracket such that the plate is in between the surface of the link clamp cylinder and the at least one bracket. Further, a feedback unit comprising of a pivot pin, a spring loaded piston and a pneumatic input unit, is connected to the clamp lever of the link clamp cylinder. The feedback unit is connected to the clamp lever by pivoting the pivot pin of the feedback unit to the clamp lever. Upon actuation of the piston of the link clamp cylinder, the clamp lever lowers thereby lowering the feedback unit until the spring loaded piston of the feedback unit contacts the plate mounted below the bracket. The spring loaded piston and the pneumatic input unit of the feedback unit are arranged such that upon actuation of the spring loaded piston, there is a blockage of pneumatic check line of the pneumatic input unit.

In one embodiment, the sensor sends a feedback signal upon detecting change in pressure of air flow into the pneumatic check line to indicate fully unclamped condition of the link clamp cylinder.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of the illustrative embodiment when read in conjunction with the accompanying drawings. One or more embodiments are now described, by way of example only, with reference to the accompanying drawings.

Figure 1:
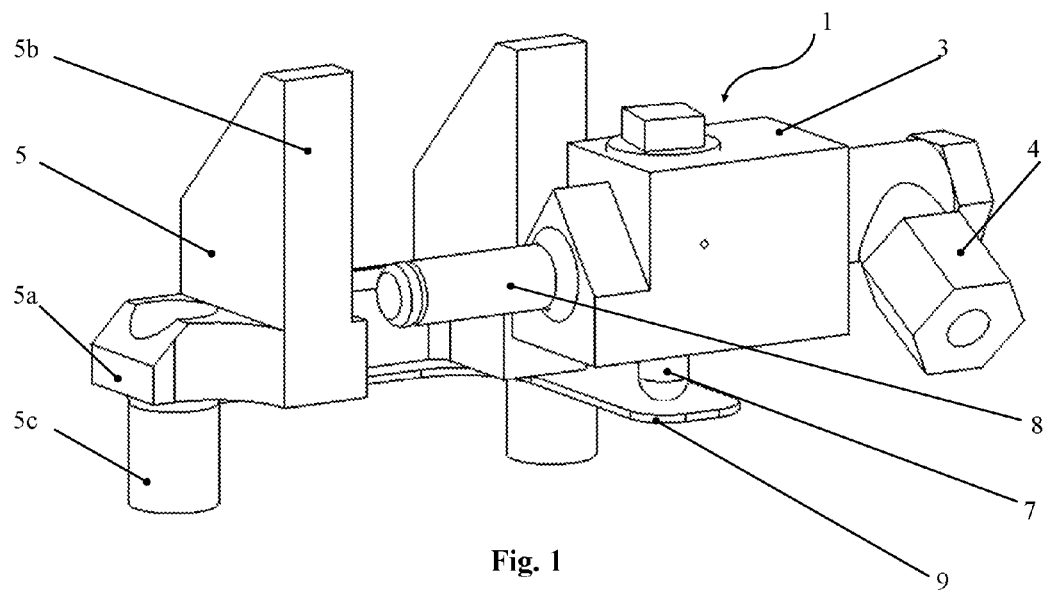
FIG. 1 shows a perspective view of the link clamp assembly according to the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE INVENTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 illustrates a perspective view of the link clamp assembly (1) according to one embodiment of the present disclosure. The link clamp assembly (1) comprises at least one bracket (5), a plate (9) mounted below the at least one bracket (5) and a feedback unit (3). The at least one bracket (5) is configured with a substantially flat base (5b), along with orientation elements (5a) extending substantially vertically from the flat base (5b). The base (5b) of at least one bracket (5) is configured with mounting elements (5c) to facilitate the mounting of the at least one bracket (5) on the link clamp cylinder (6) (best shown in FIG. 2). The feedback unit (3) comprises a pivot pin (8), a spring loaded piston (7) and a pneumatic input unit which is at 2 bar pressure connected to air catch sensor unit (4) (more clearly shown in FIG. 3). The pivot pin (8) is arranged horizontally or substantially horizontally to the top surface of the link clamp cylinder (6). The spring loaded piston (7) is substantially vertically aligned with the pivot pin (8). The spring loaded piston (7) is configured in such a way that one end of the spring loaded piston (7) contracts with the plate (9) during unclamping of a clamp lever (2) of the link clamp cylinder (6) (shown in FIG. 5) and blocks pneumatic check line of the pneumatic input unit (4).

Figure 2:
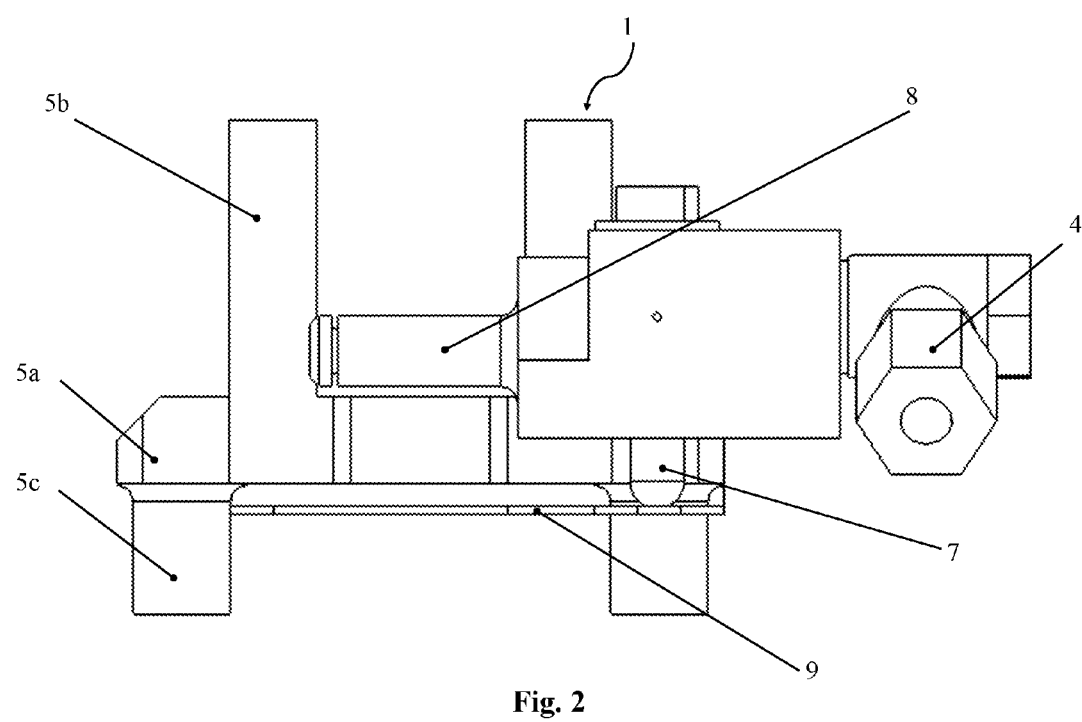
FIG. 2 shows a front view of the link clamp assembly according to the present disclosure.

FIG. 2 illustrates a front view of the link clamp assembly (1) according to one embodiment of the present disclosure. The spring loaded piston (7), pivot pin (8) and the pneumatic input unit (4) are configured in the feedback unit (3) such that, when the feedback unit (3) is actuated by the clamp lever (2) (shown in FIG. 5), the spring loaded piston (7) contacts the plate (9) and compresses or presses inwards, thereby blocking pneumatic check line of the pneumatic input unit (4). The plate (9) is placed below the flat base of the bracket (5b) at predetermined distance, above the top surface of the link clamp cylinder (6). The pivot pin (8) with one of its ends fixed to the feedback unit (3) extends horizontally with the top surface of the link clamp cylinder (6) to enable pivoting of the clamp lever (2). The orientation elements (5a) of the at least one bracket (5) are placed at a predetermined distance to facilitate the clamp lever (2) to oscillate freely in between the gap of the orientation elements (5a) of the at least one bracket (5).

Figure 3:
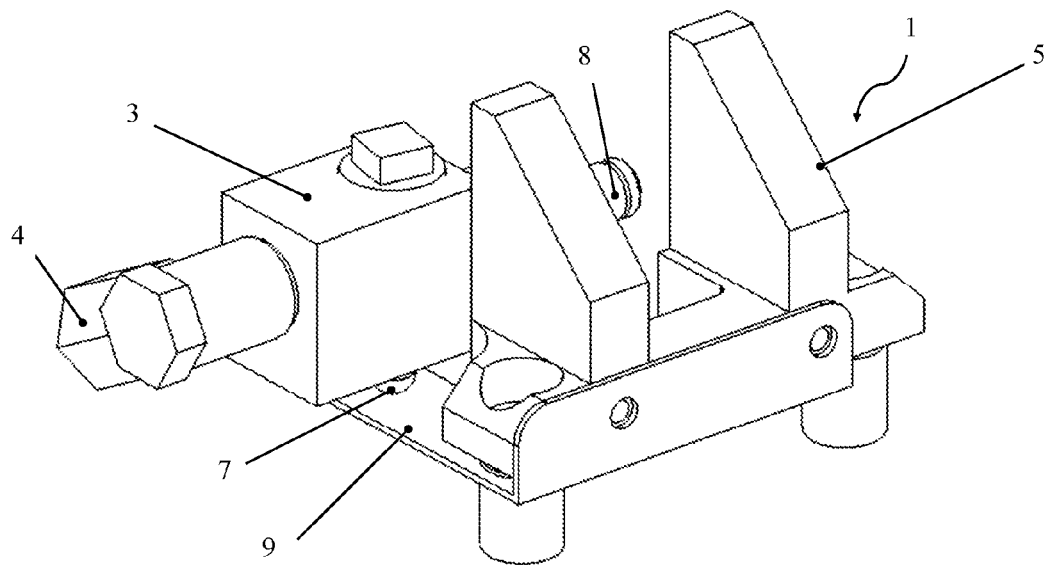
FIG. 3 shows another perspective view of the link clamp assembly according to the present disclosure.

FIG. 3 illustrates perspective view of the link clamp cylinder (6) according to one embodiment of the present disclosure. The plate (9) is fixed to the substantially flat base (5b) of the at least one bracket (5). The pneumatic input unit (4) is placed onto the feedback unit (3) such that, the spring loaded piston (7) when compressed, blocks the pneumatic check line of the pneumatic input unit (4), thereby changing the pressure builds in the line followed by air catch sensor sending the same into the pneumatic input unit (4).

Figure 4:
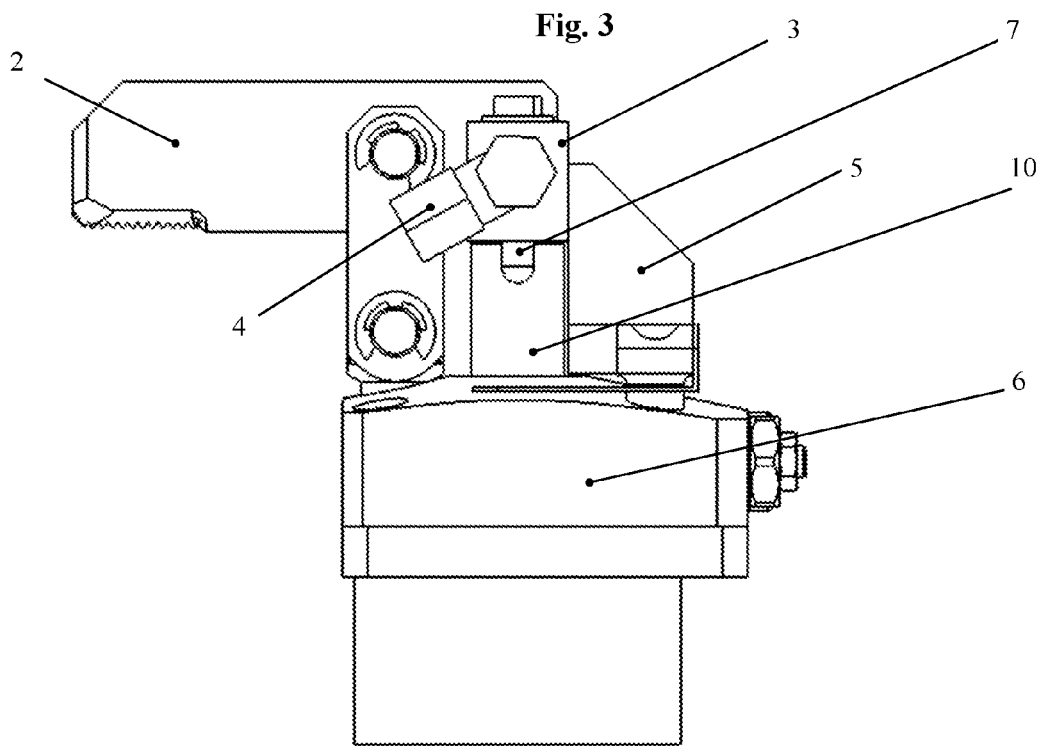
FIG. 4 shows a side view of the assembled link clamp assembly with link clamp cylinder in a clamped condition according to the present disclosure.

FIG. 4 illustrates a side view of the link clamp assembly (1) assembled on the link clamp cylinder (6) in clamped condition according to one embodiment of the present disclosure. The link clamp assembly (1) consists of a clamp lever (2) connected to a piston (10) at the pivoted end of the clamp lever (2). At least one bracket (5) is mounted on the link clamp cylinder (6) by mounting the mounting elements (5b) of the at least one bracket (5) and a plate (9) is mounted on the substantially flat base (5b) of the at least one bracket (5). The clamp lever (2) is pivoted to the pivot pin (8), wherein the pivot pin (8) is configured in the feedback unit (3).

Further, the clamped condition of the link clamp assembly is defined as top most position or top dead centre position in the stroke length of the piston (10) of the link clamp cylinder (6). In clamped condition, there will be no movement of the piston (10), and the piston (10) will be at the top dead centre position, thereby the clamp lever (2) being connected to the piston (10) will be at the top most position or clamped position. As the pivot pin (8) fixed to the feedback unit (3) is pivoted to the clamp lever (2), the feedback unit (3) will also be at the top most position and the spring loaded piston (7) will not be compressed. Hence the clamped condition is also called no load condition as there is no compression of the spring loaded piston (7) of the feedback unit (3).

Figure 5:
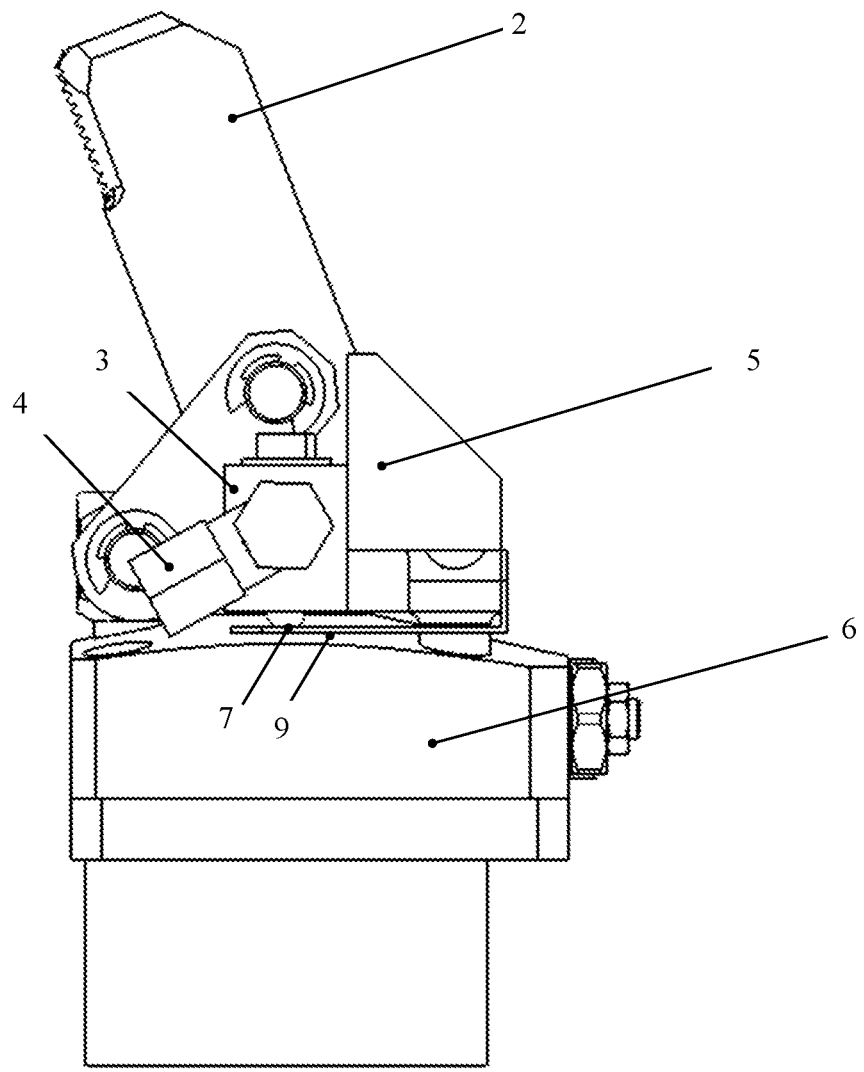
FIG. 5 shows a side view of the assembled link clamp assembly with link clamp cylinder in an unclamped condition according to the present disclosure.
Figure 6:
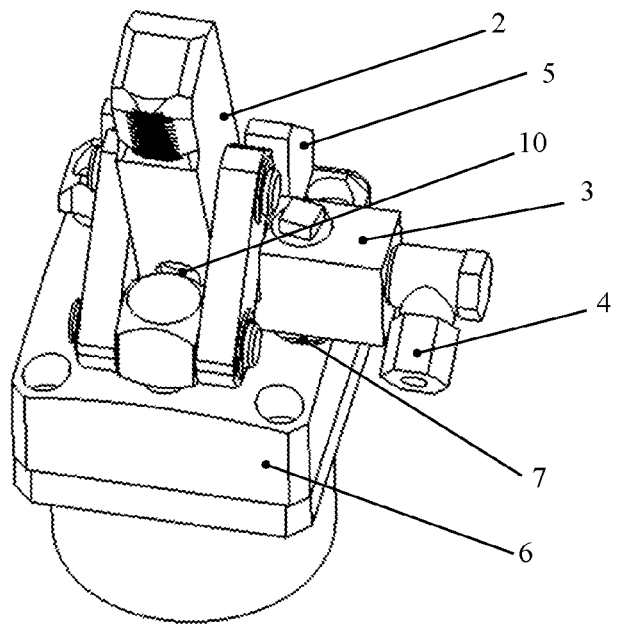
FIG. 6 shows a perspective view of the link clamp assembly with link clamp cylinder in the unclamped condition according to the present disclosure.
Figure 7:
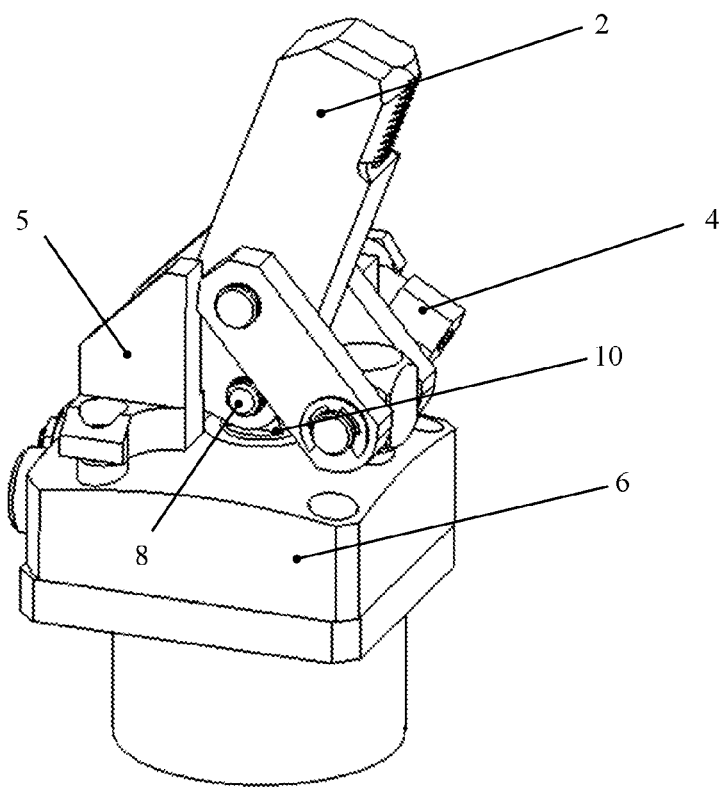
FIG. 7 shows another perspective view of the link clamp assembly with link clamp cylinder in the unclamped condition according to the present disclosure.

FIG. 5 illustrates side view of the link clamp assembly (1) assembled on a link clamp cylinder (6) in fully unclamped condition according to one embodiment of the present disclosure. FIGS. 6 and 7 show perspective views of the link clamp assembly (1) assembled on the link clamp cylinder (6) in the fully unclamped condition according to one embodiment of the present disclosure. The fully unclamped condition of the link clamp cylinder (6) is defined as lowest position or bottom dead centre position in the stroke length of the piston (10) of the link clamp cylinder (6). During unclamping, the piston (10) is actuated hydraulically or pneumatically and thereby the piston (10) descends from the top dead centre position. The clamp lever (2) with the pivot end being connected to the piston (10) also descends, thereby oscillating the clamp lever (2) at the pivot. The pivot pin (8) configured in the feedback unit (3) and pivoted to the clamp lever (2) also descends, thereby actuating the feedback unit (3). When the piston (10) reaches the end stroke, the spring loaded piston (7) of the feedback unit (3) contacts the plate (9) and gets compressed. The compressed spring loaded piston (7) retracts and blocks the pneumatic check line of the pneumatic input unit (4), this causes change in the pressure of air flow into the pneumatic check line. The change in pressure of air flow will be detected by a sensor placed at the vicinity of the link clamp assembly, sends a feedback signal to the machine safety logic to indicate the fully unclamped condition of the link clamp cylinder (6). The feedback signal sent by the sensor to the machine safety logic can be a positive feedback signal or a negative feedback signal. The sensor used to detect the change in pressure of air flow into the pneumatic check line is an air or pneumatic sensor.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

1: Link clamp assembly
2: Clamp lever
3: Feedback unit
4: Pneumatic input unit
5: Bracket
5a: Flat base of bracket
5b: Orientation element of bracket
6: Link clamp cylinder
7: Spring loaded piston
8: Pivot pin for lever
9: Plate
10: Piston

What is claimed is:

1. An unclamp feedback unit for a link clamp cylinder, the unclamp feedback unit comprising a pivot pin, a spring loaded piston and a pneumatic input unit; wherein a clamp lever pivots freely between orientation elements; the orientation elements being separated by a predetermined distance, and extending vertically from a flat base of at least one bracket and wherein the clamp lever is pivoted by one end of the pivot pin, and wherein an opposite end of the pivot pin is fixed to a feedback unit of a link clamp assembly; wherein, upon actuation, one end of the spring loaded piston contacts a plate of the link clamp assembly, and the spring loaded piston is pressed inwards into a pneumatic check line of the pneumatic input unit, thereby causing a change of pressure of air flow in the pneumatic check line.

2. The unclamp feedback unit as claimed in claim 1, wherein a sensor is configured to receive input from the pneumatic input unit to send a feedback signal upon detecting the change of the pressure of the air flow in the pneumatic check line to indicate a fully undamped condition of the link clamp cylinder.

3. The unclamp feedback unit as claimed in claim 2, wherein the sensor comprises an air or pneumatic sensor.

4. A link clamp assembly comprising: at least one bracket including a substantially flat base with downward extending mounting elements to facilitate mounting of the link clamp assembly on a link clamp cylinder; a plate connected to the substantially flat base of the at least one bracket; and a feedback unit comprising of a pivot pin, a spring loaded piston and a pneumatic input unit, wherein one end of the spring loaded piston contacts the plate and the spring loaded piston is pressed inwards into a pneumatic check line of the pneumatic input unit, thereby causing a change of pressure of air flow in the pneumatic check line; and wherein the at least one bracket is configured with orientation elements, the orientation elements extending vertically from the flat base and separated by a predetermined distance to enable a clamp lever of the link clamp of the link clamp cylinder to pivot freely between the orientation elements; and wherein the clamp lever is pivoted by one end of the pivot pin, and wherein an opposite end of the pivot pin is fixed to the feedback unit.

5. The link clamp assembly as claimed in claim 4, wherein the plate is configured with a substantial flat surface, and wherein at least one side face of the plate is perpendicular to the substantial flat surface.

6. A method of assembling a link clamp assembly, comprising:
    mounting at least one bracket including a substantially flat base with downward extending mounting elements on a link clamp cylinder;
    connecting a plate to the substantially flat base of the at least one bracket; and
    connecting a feedback unit comprising a pivot pin, a spring loaded piston and a pneumatic input unit to an air catch sensor unit, wherein one end of the pivot pin is adapted to pivot a clamp lever of the link clamp cylinder and an opposite end of the pivot pin is fixed to the feedback unit,
    wherein one end of the spring loaded piston contacts the plate and moves inwards into a pneumatic check line of the pneumatic input unit, thereby causing a change of pressure of an air flow in the pneumatic check line.

7. The method as claimed in claim 6, wherein the air catch sensor unit detects the change of pressure of air flow in the pneumatic check line of the pneumatic input unit and sends a positive feedback signal to machine safety logic to indicate a fully unclamped condition of the link clamp cylinder.

* * * * *